United States Patent [19]

Mathias

[11] Patent Number: 4,918,992
[45] Date of Patent: Apr. 24, 1990

[54] HIGH PERFORMANCE GLASS TO METAL SOLDER JOINT

[75] Inventor: Milton W. Mathias, El Paso, Colo.

[73] Assignee: Honeywell Inc., Minneapolis, Minn.

[21] Appl. No.: 324,987

[22] Filed: Mar. 14, 1989

Related U.S. Application Data

[63] Continuation of Ser. No. 117,776, Nov. 5, 1987, abandoned.

[51] Int. Cl.⁵ ............................ G01L 7/08; G01L 9/06
[52] U.S. Cl. ............................................ 73/727; 338/4

[58] Field of Search .................. 73/706, 708, 717, 720, 73/721, 723, 726, 727, DIG. 4, 756; 338/4, 42; 29/621.1

[56] References Cited

U.S. PATENT DOCUMENTS 4,019,388 4/1977 Hall, II et al. ...................... 228/124

Primary Examiner—Donald O. Woodiel
Attorney, Agent, or Firm—W. T. Udseth

[57] ABSTRACT

A sleeveless glass to metal solder joint wherein the glass is coated with a solder wetable metal. The invention is particularly useful in high pressure environments or as part of a pressure sensor assembly which includes a silicon based pressure sensor.

7 Claims, 1 Drawing Sheet

HIGH PERFORMANCE GLASS TO METAL SOLDER JOINT

This application is a continuation, of application Ser. No. 07/117,776, filed Nov. 5, 1987, now abandoned.

BACKGROUND

1. Field of the Invention

This invention relates to glass to metal solder joints and particularly to the use of such joints in high pressure environments or as part of a pressure sensor system wherein a silicon die is attached to a glass tube.

2. Related Art

In order to strengthen glass to metal joints, particularly in high pressure environments, a tight fitting metal sleeve or support would be placed around the joint. This would complicate the joint structure and added cost. Further, since the sleeve was often soldered to the metalized surface of the glass, at high pressures and temperature extremes, the sleeve was found to induce stresses which caused the glass to crack.

An improved glass to metal solder joint, especially for high pressure environments, is thus highly desirable.

SUMMARY OF THE INVENTION

Part of the surface of a glass member, preferably a glass tube, is coated with a solder wetable metal. A metal member having a solder wetable surface is joined to the glass member with solder.

The end of the tube adjacent the metal is preferably coated with a solder wetable metal. Glass tubes with relatively thick walls and small inside diameters are preferred in high pressure environments. The solder can be soft or hard.

The above described glass tube to metal solder joint is particularly useful in combination with a silicon die pressure sensor structure to form a pressure sensor assembly.

DESCRIPTION OF THE PREFERRED EMBODIMENTS

Figure 1:
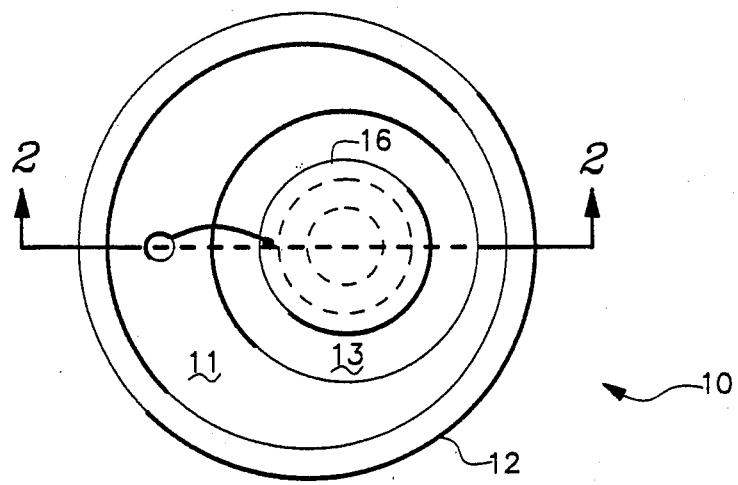
FIG. 1 is a plan view of a pressure sensor assembly which includes the invention.

FIG. 1 shows a useful pressure sensor assembly 10 which includes the present invention. Therein a metal member 11 is formed substantially as a cylinder including an upper lip 12, a cylindrical recess 13, and a hole 14 in the bottom surface 15 of member 11.

Within recess 13 is a glass member 16 (preferably a tube). Tube 16 is shown with relatively thick walls and has opposite ends 17 and 18.

The joint between metal member 11 and glass member 16 is formed at interior surface 19 of metal member 11. Surface 19 can itself be solder wetable or have a solder wetable area (not shown) which when adjacent end 18, will substantially cover at least the surface of end 18 of glass member 16. Likewise, the surface of end 18 and the surface of glass member 16 adjacent end 18 (i.e. part of the exterior sidewalls of glass member 16) are preferably coated with a solder wetable metal.

Useful solder wetable metals for metal member 11 are gold or nickel. A useful solder wetable metal for glass member 16 is a mixture of titanium, platinum and gold. The titanium adheres well to glass, and serves as a base for the other solder wetable metals.

Figure 2:
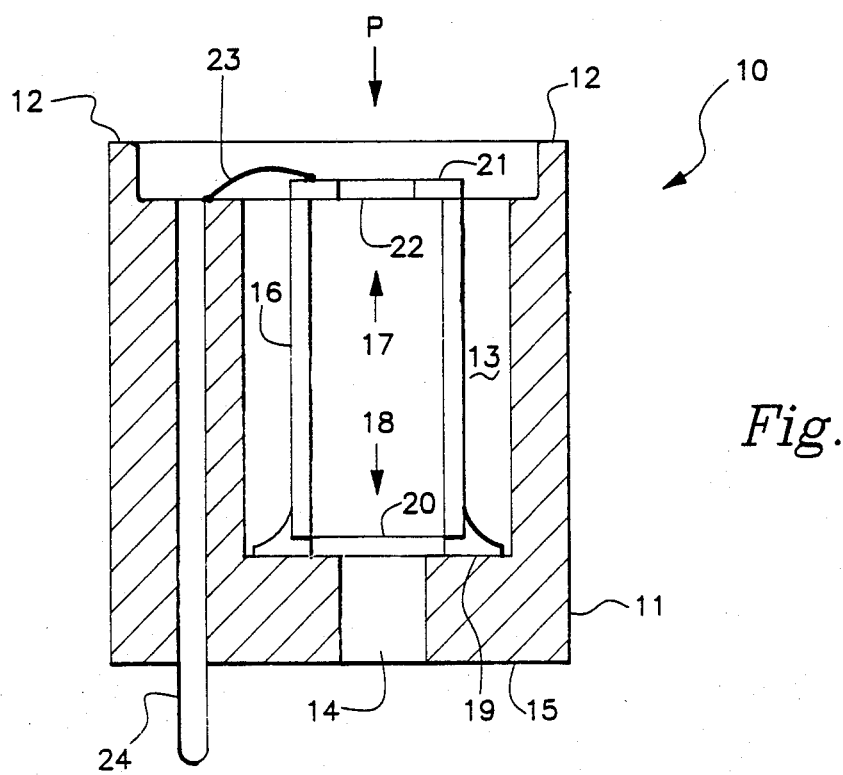
FIG. 2 is a sectional view along line 2—2 of FIG. 1.

Solder 20 forms the joint between surface 19 and end 18. As shown in FIG. 2, solder 20 forms a thin layer (e.g. 2 to 3 mils thick) between surface 19 and end 20 and "wicks up" the sides of glass tube 16 a short distance onto part of the metalized coating.

The above described solder joint is very strong and has not cracked at ambient pressure as high as 12,000 pounds per square inch (PSI) across the joint over a range of 40° C. to 125° C. By way of example, a pyrex glass tube with an inside diameter of 0.040 inches and an outside diameter of 0.128 inches can be used at 12000 PSI to form the solder joint. Prior glass to metal solder joints which employ a sleeve, demonstrate significant strength problems at 1500 PSI. For low pressure (e.g. 14 to 500 PSI) a glass tube with 0.010 inside diameter and a 0.171 inch outside diameter is sufficient.

Hole 14 provides access between the interior of glass tube 16 and the exterior of metal member 11.

In assembly 10, a silicon die 21 includes a pressure sensor 22 which is exposed, in part, to the interior of tube 16. Typically, the opposite surface of pressure sensor 22 is exposed to a pressure P to be measured. With assembly 10 fitted into a casing (not shown) whereby hole 14 is exposed to a reference pressure, a differential pressure sensor is provided. Hole 14 could be sealed, and assembly 10 thereby converted to an absolute pressure sensor.

A useful silicon pressure sensor for sensor 22 is disclosed in U.S. Pat. No. 4,665,754 the same being incorporated herein by reference. Typically the pressure responsive portion of sensor 22 will be surrounded by end 17 of tube 16.

In assembly 10, glass tube 16 serves to isolate or reduce temperature induced stress on die 21 due to differences in the temperature coefficients of metal member 11 and glass tube 16. Typically tube 16 will be ⅛ inch long, but much shorter lengths are useful with the particular length being highly application dependent.

Tube 16 is preferably bonded to die 21 with a bond which exhibits high elastic qualities, but a bond which relieves stress such as a bond of rubber material is also possible.

The joint itself is preferably formed by laying a solder preform on the solder wetable area of metal member 11. Glass tube 16 is placed in contact with the solder preform and metal 11 is heated until the solder is at its reflow temperature.

Electrical signals can flow to or from die 21 and sensor 22 along, for example, wire bond 23 and pin 24.

We claim:

1. A pressure sensor comprising:
   a semiconductor die including a pressure sensing means, wherein said pressure sensing means is exposed at a surface of said die;
   a glass member having first and second opposed ends, wherein said first end is bonded to said semiconductor die so that said first end surrounds said pressure sensing means on said surface of said semiconductor die, and wherein substantially all of the surface of said glass member at said second end is coated with a solder wetable material which includes titanium;
   a metal member having a solder wetable area, wherein said solder wetable area will, when adjacent said second end, substantially cover at least said surface of said glass at said second end; and a solder joint between said second end and said solder wetable area, wherein said solder is the sole means of support provided to said joint.

2. The sensor of claim 1 wherein said solder joint is approximately in the range of 2 to 3 mils thick between said second end of said solder wetable area.

3. The sensor of claim 1 wherein said solder wetable material also includes platinum and gold, and solder wetable area includes gold or nickel.

4. A high pressure glass to metal joint, comprising:
a glass member having an end, wherein substantially all of the surface of said glass member at said end is coated with a solder wetable material which includes titanium;
a metal member having a solder wetable area, wherein said solder wetable area will, when adjacent said second end, substantially cover at least said surface of said glass at said end; and
solder between said end and said solder wetable area, wherein said solder forms said joint with a strength sufficient for use in ambient pressures substantially above 14 pounds per square inch, wherein said solder is the sole means of support provided to said joint.

5. The joint of claim 4 wherein said solder joint is approximately in the range of 2 to 3 mils thick between said end and said solder wetable area.

6. The joint of claim 4 wherein said solder wetable material also includes platinum and gold, and said solder wetable area includes gold or nickel.

7. A pressure sensor assembly comprising:
a semiconductor die including a pressure sensing means, wherein said pressure sensing means is exposed at a surface of said die;
a glass member having first and second opposed ends, wherein said first end is bonded to said semiconductor die so that said first end surrounds said pressure sensing means on said surface of said semiconductor die, and wherein substantially all of the surface of said glass member at said second end is located with a first thin layer of a solder wettable material;
a steel holder assembly having a second thin layer of a solder wettable material on a portion of the surface of the holder, said second thin layer being configured so that when said holder is adjacent said second end of said glass, said second thin layer will substantially cover at least said surface of said glass at said second end; and
a solder joint including solder directly between said first and second thin layers, wherein said solder is the sole means of attaching said second end of said glass to said holder.

* * * * *